(12) United States Patent
Baumann et al.

(10) Patent No.: US 6,780,457 B2
(45) Date of Patent: Aug. 24, 2004

(54) METHOD FOR PRODUCING A HIGH-QUALITY INSULATION OF ELECTRICAL CONDUCTORS OR CONDUCTOR BUNDLES OF ROTATING ELECTRICAL MACHINES BY MEANS OF FLUIDIZED-BED SINTERING

(75) Inventors: Thomas Baumann, Wettingen (CH); Johann Nienburg, Heidelberg (DE); Jörg Sopka, Schwetzingen (DE)

(73) Assignee: ALSTOM Technology LTD, Baden (CH)

( * ) Notice: Subject to any disclaimer, the term of this patent is extended or adjusted under 35 U.S.C. 154(b) by 0 days.

(21) Appl. No.: 10/168,620

(22) PCT Filed: Dec. 21, 2000

(86) PCT No.: PCT/CH00/00682

§ 371 (c)(1),
(2), (4) Date: Oct. 11, 2002

(87) PCT Pub. No.: WO01/48897

PCT Pub. Date: Jul. 5, 2001

(65) Prior Publication Data

US 2003/0091735 A1 May 15, 2003

(30) Foreign Application Priority Data

Dec. 28, 1999 (DE) .......................................... 199 63 376

(51) Int. Cl.[7] .............................. B05D 1/24; B05D 1/38
(52) U.S. Cl. ....................... 427/118; 427/104; 427/120; 427/185; 427/203
(58) Field of Search ................................. 427/459–461, 427/470, 486, 182, 202–203, 386, 388.2, 104, 116–120, 185

(56) References Cited

U.S. PATENT DOCUMENTS 3,145,127 A * 8/1964 Baun 4,137,515 A * 1/1979 Akao et al.

(List continued on next page.)

FOREIGN PATENT DOCUMENTS

| DE | 4037972 A1 | 6/1991 | |
|---|---|---|---|
| DE | 19504532 A1 | 8/1996 | .......... H01B/19/00 |
| DE | 19735748 A1 | 7/1998 | |
| DE | 19860412 A1 | 6/2000 | |
| EP | 0660336 A2 | 12/1994 | |
| GB | 999608 | 7/1965 | |
| WO | WO97/43816 | 11/1997 | ............ H02K/3/24 |

OTHER PUBLICATIONS

Powder Coating, The Complete Finisher's Handbook, Ed. by N.P. Liberto, PE pp. 108–110, 1994.*
International Search Report for PCT Patent Application No. PCT/CH00/00682, mailed Apr. 5, 2001.
Eckner, G., "Anlagen fur das Wirbelsinterverfahren", *Kunstoffe*, Bd. 56 (1966), pp. 723–728.
Search Report from DE 199 63 376.2 (Dec. 22, 2000).

*Primary Examiner*—Fred J. Parker
(74) *Attorney, Agent, or Firm*—Cermak & Kenealy LLP; Adam J. Cermak (57) ABSTRACT

The invention discloses a process for producing a high-quality insulation on a conductor or conductor bundle of rotating electrical machines, in which, in successive immersion passes in a fluidized-bed sintering tank, internal corona-discharge protection, insulation and external corona-discharge protection are applied, in each case with layer thicknesses of $\leq 0.2$ mm. The sintering and curing take place at temperatures of approx. 200° C., so that it is possible to use materials which satisfy the demands which are imposed on the insulation of conductors or conductor bundles of this type for rotating electrical machines. Furthermore, the production process, in particular the layer thickness selected for the individual layers, ensures that the individual layers are free of defects, so that it is impossible for there to be any partial discharges, which would otherwise lead to damage to the insulation.

21 Claims, 3 Drawing Sheets

U.S. PATENT DOCUMENTS

| | | |
|---|---|---|
| 4,616,407 A | 10/1986 | Tamaki et al. |
| 4,682,410 A | 7/1987 | Kreuzer et al. |
| 4,760,296 A | 7/1988 | Johnston et al. |
| 4,806,388 A | 2/1989 | Mochizuki et al. |
| 4,885,187 A * | 12/1989 | Koenig |
| 5,650,031 A | 7/1997 | Bolon et al. |

* cited by examiner

METHOD FOR PRODUCING A HIGH-QUALITY INSULATION OF ELECTRICAL CONDUCTORS OR CONDUCTOR BUNDLES OF ROTATING ELECTRICAL MACHINES BY MEANS OF FLUIDIZED-BED SINTERING

TECHNICAL FIELD

The invention relates to the field of the insulation of rotating electrical machines. In particular, the invention relates to a process for producing a high-quality insulation for conductors or conductor bundles as are used in rotating machines, in the form of stator coils, transposed bars and excitation conductors.

PRIOR ART

Various processes are customarily used in the field of insulation of conductors or conductor bundles of rotating electrical machines.

In one process, tapes comprising a glass-fiber support and mica paper are wound helically in layers onto a stator conductor until a desired insulation thickness is reached. Subsequent impregnation in epoxy resin displaces residual air from the insulating winding formed in this way, and the layers of tape are adhesively bonded. Curing in a suitable mold imparts the final shape to the insulation. For production reasons, in this process the mica platelets are oriented in the direction of the tape, which in the finished insulation results in the mica platelets being oriented parallel to the conductor surface. In the resin rich technique, epoxy resin in the B state is admixed with the tape and is consolidated by hot pressing of the bar.

According to a further process, which is known from EP 0 660 336 A2, tapes consisting of thermoplastic filled with mica are wound around the stator conductors. Consolidation and shaping in this case take place by means of hot pressing of the stator conductor around which the tape has been wound, during which process air is displaced, the thermoplastic is melted and the layers of the winding are adhesively bonded. In this process too, the mica platelets are oriented parallel to the conductor surface. The air is not completely expelled in any of the processes. Air-filled gaps and holes remain, in which, in the event of a voltage load, partial discharges in the nC range and above occur.

Finally, the stator conductor can also be insulated by extrusion of thermoplastics without fillers, i.e. also without mica, as described in U.S. Pat. No. 5,650,031.

Nowadays, the conductors of rotating electrical machines which are to be insulated are generally structures of a very complex shape, in the form of bars or coils. A straight part of the conductors is located in the grooves of the stator of the machine. A curved part of the conductors, after suitable connection to adjacent bars and coils, forms a winding head which projects out of the stator at both ends. In the case of large rotating machines, the length of the straight part may exceed 6 m. A problem hitherto has been that insulation and conductor usually have different coefficients of thermal expansion a which, over the course of time, on account of thermal stresses, may lead to defects in the insulation as a result of cavities which form where the insulation becomes detached, and that defects, for example inclusions of air, are formed during the production of the insulation. Partial discharges may occur at such defects, leading to damage to the insulation. In this case, partial discharge activities in the 100 nC range are quite customary.

In view of these partial discharge activities, hitherto it has only been possible for the machine insulation to operate reliably as a result of the barrier action of mica platelets oriented perpendicular to the field direction. This prevents the formation of flashover passages leading out of the cavities. 2.5 to 2.75 kV/mm is generally regarded as the upper limit for long-term reliability of the operating field strength. However, a maximum level such as this is exceeded, in some cases considerably, by other insulation systems used in medium- or high-voltage insulation.

For example, the maximum field for long-term operation in pin-type insulators, in which an alumina-filled epoxy resin is used for gas-insulated circuits, is 4 kV/mm, and the maximum field for high-voltage cables, in which polyethylene is used, is approx. 12 kV/mm. A common feature of these conventional insulation systems is that there are no partial discharges under operating load.

However, since, the conventional processes and materials using mica which are currently in use are substantially already more than thirty years old, at best incremental improvements are to be expected from any further developments to this prior art. Therefore, it appears highly unlikely that it will be possible to further develop this prior art to develop a higher-quality insulation which can be produced with shorter throughput times and lower manufacturing costs compared to the prior art, and also in an environmentally friendly production process, i.e. without the use of solvents, without emissions and without the production of special waste, and which does not include any defects or, if there are defects, these defects do not lead to any partial discharges.

SUMMARY OF THE INVENTION

Therefore, it is an object of the present invention to provide a process for producing a high-quality insulation for conductors or conductor bundles in which the insulation has a high quality and can be produced with short throughput times, low manufacturing costs and in an environmentally friendly manner.

According to the invention, this object is achieved by the process for producing a high-quality insulation of conductors or conductor bundles having the features of patent claim 1. Advantageous refinements of the invention are given in the subclaims.

This inventive process for producing a high-quality insulation for conductors or conductor bundles without cavities which may lead to partial discharges under test and operating loads means that the oriented mica platelets are no longer required. This greatly facilitates both the choice of production processes and the choice of materials for the insulation, since for many polymers it is difficult to incorporate mica in concentrations of more than 40% by weight.

BRIEF DESCRIPTION OF THE DRAWING

The invention is explained in more detail below with reference to preferred exemplary embodiments which are illustrated in the drawing, in which:

FIG. 3-1 shows a first flow diagram for a process according to the invention.

FIG. 3-2 shows a second flow diagram for a process according to the invention.

WAY(S) OF CARRYING OUT THE INVENTION

The following text provides an extensive description of a process for producing a high-quality insulation for conductors or conductor bundles of rotating electrical machines. First of all, the basic structure of the insulation will be dealt with, and then the process according to the invention will be explained in detail.

The insulation which is applied using the process according to the invention comprises three layers. The first layer forms an internal corona-discharge protection, consisting of conductively or semiconductively filled polymer. In this case, a polymer which can be successfully joined to the polymer material of the insulating layer which follows it is used. It is preferable to use the same polymer as in the insulating layer.

As is the case in high-voltage cables, the internal corona-discharge protection has the role of decoupling electrical and mechanical boundary layers. In electrical terms, the internal corona-discharge protection has the same potential as the metallic conductor below it, i.e. is part of the electrical conductor; in mechanical terms, by contrast, it is part of the insulation. This ensures that any points where the insulating sleeve and conductor become detached as a result of thermal interaction are free from partial discharges, since there is no voltage drop across the detachment.

The process according to the invention for the production of this high-quality insulation for conductors and conductor bundles is intended to satisfy the following demands:

1) Firstly, the production process is to be substantially independent of the particular geometry of the initial bar or coil, i.e. of the transposed, uninsulated, consolidated bar or coil.
2) The insulation is to be of a high quality, i.e. compared to the prior art is to have an improved thermal stability up to approx. $T_{max}$=180° C. and is to be able to withstand a maximum field for long-term operation of approx. 5 kV/mm without being damaged.
3) Furthermore, the process is to allow production of an insulation of constant thickness with a tolerance $\Delta d/d<10\%$—even if the tolerances of the initial bar or coil are considerably greater while it is to be possible to produce layer thicknesses of from 0.3 to 5 mm.
4) To shorten the production time, the throughput time per bar or coil is to be at most 1 to 3 hours.

In view of these demands which are to be satisfied by the process according to the invention, one could consider using conventional fluidized-bed sintering processes as the starting point.

A conventional fluidized-bed sintering process of this type is described, for example, in U.S. Pat. No. 4,806,388, entitled "Method and apparatus for coating metal part with synthetic resin". In the process described in that document, a synthetic resin layer is applied to a surface of a metal part, while the metal part is situated inside a pulverulent compound comprising a synthetic resin which can be melted by the application of heat. The resin used is a synthetic resin comprising copolymer of tetrafluorethylene and ethylene (trade name AFLON®), since this offers the desired narrow range between melting-point range and decomposition-temperature range. This coating material has a very high melting point, at 260° C., while its decomposition point is at 360° C.; therefore, during the coating operation the part which is to be coated is heated to a range between 300° C. and 340° C. In this process, the preheated metal part is introduced into a coating material in powder form. Then, the metal part is heated by means of induction heating to a temperature which is higher than a melting point and, at the same time, lower than a thermal decomposition point of the synthetic resin. As a result, some of the pulverulent material which surrounds the heated metal melts, and the part which has melted is deposited as a synthetic resin layer on the surface of the heated metal. Furthermore, in this process air is blown into the pulverulent material, in order to keep it in a liquid state. After the coating, the metal part is removed from the pulverulent material. The induction heating, unlike other fluidized-bed sintering processes, allows the desired coating thickness to be reached in one pass, while thickness fluctuations are minimal, since the temperature of the metal can easily be controlled by means of the induction heating. This conventional fluidized-bed sintering coating is used, for example, to produce a resin-coated rotor of a compressor for a motor vehicle.

Fluidized-bed sintering, such as for example the process described above, therefore requires a significantly lower outlay in terms of manufacturing technology than the current insulation process. Expensive special equipment, such as winding robots, vacuum/pressure vessels, devices for the cooled storage of liquid resin, etc., is eliminated. They are replaced by fluidized-bed sintering tanks of a suitable size. This allows a considerable saving in terms of investment costs, reduced throughput times, for example of approx. 2 h for a large transposed bar, and a high level of automation.

However, it is customary for fluidized-bed sintering in the electrical engineering sector to be used predominantly for wire insulations and to seal relatively small motor stators and rotors and for metal coating per se. In both cases, contrary to the demands imposed by the present invention, the insulation thickness, which is in the region of a few tenths of a millimeter or less, and the electrical load are low.

Therefore, in the process according to the invention, it is necessary to modify the conventional process and the materials used in such a manner that it is possible to achieve a greater insulation thickness and an increased resistance to partial discharges. Moreover, the aim was for the process to be simple and energy-saving to use.

Therefore, the conventional process is to be modified, inter alia, in such a manner that there is no need for any special materials or excessively high heating temperatures for production of a coating without defects, since both such conditions lead to increased production and energy costs.

Figure 1:
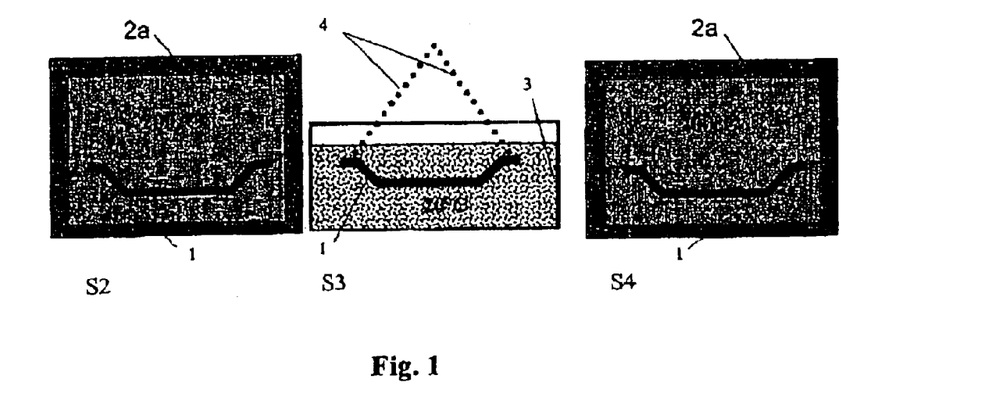
FIG. 1 shows important process steps involved in the process according to the invention, in accordance with a first exemplary embodiment.
Figure 2:
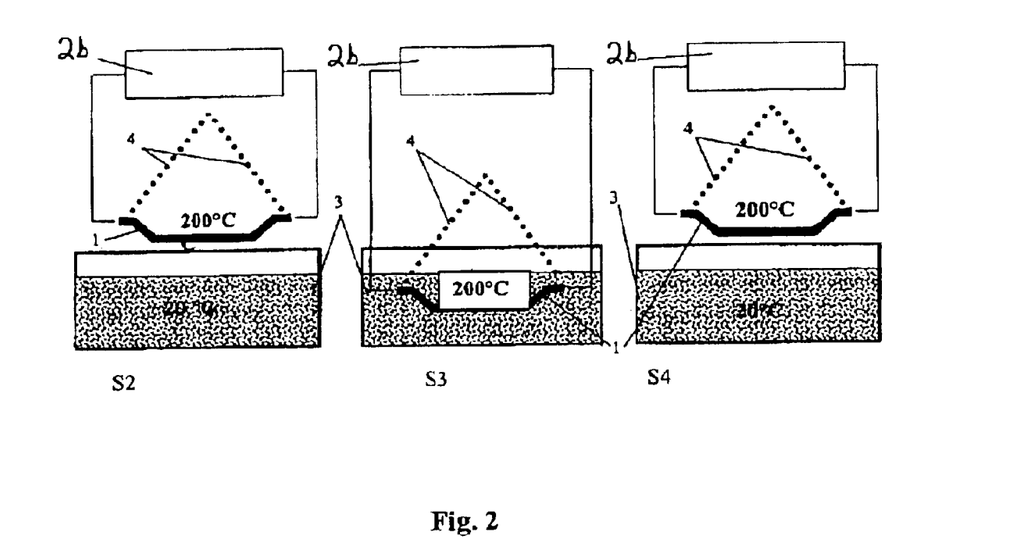
FIG. 2 shows important process steps involved in the process according to the invention, according to a second exemplary embodiment.

The process according to the invention can be implemented in two alternative ways, as shown in FIGS. 1 and 2. In both embodiments, a transposed bar or a coil 1 is preheated before the coating starts. The temperature to which the bar or coil is preheated is predetermined by the melting and crosslinking temperature of the coating powder; in the case illustrated in FIG. 1, it is, for example, 200° C., therefore approx. 20° C. above the desired coating temperature. This temperature which is higher by approx. 20° C. is necessary in order to compensate for temperature losses during transport from a furnace or heating station outside the coating device to the coating device itself. In the alternative embodiments, the significant difference lies in the nature of the heating used to preheat the bar or the coil 1. In the case shown in FIG. 1, furnace heating 2a is used, while in the case illustrated in FIG. 2 electrical heating 2b is used, connected directly to the bar or coil 1. This electrical heating 2b can be implemented either as induction heating by medium- or high-frequency coils arranged around the conductor or as resistive heating as a result of the bar or coil being connected to a direct voltage or low voltage.

Moreover, a further special embodiment incorporates electrostatic charging of the coating powder. In this way, it is possible to achieve improved adhesion of the coating powder to the bar or coil, in particular in the edge region. In particular, an increased insulation thickness in the edge regions is achieved in this way.

In the process according to the invention, the insulation is built up in layers. For coating, the preheated bar or coil 1, which is secured to a lowering device 4, is immersed in a fluidized-bed tank 3. The diameter and depth of the fluidized-bed tank 3 are preferably selected in such a way that the bar or coil is at a distance of at least 50 mm from the fluidized-bed tank walls when it is immersed and can be completely submerged. The layer thickness of the coating is controlled by the dwell time of the bar or coil 1 in the fluidized-bed tank 3. To prevent the inclusion of bubbles, which would form defects at which partial discharges could occur, but without the need to use a special coating material and higher production temperatures, the immersion time is to be selected in such a way that the layer thickness produced in each immersion pass does not exceed 0.2 mm, and is preferably approx. 0.1 mm, corresponding to an immersion time of approx. 1 to 5 seconds. To homogenize the powder in the fluidized-bed sintering tank 3, which promotes the uniformity of the coating, the fluidized-bed tank 3 may additionally be stirred, vibrated or subjected to ultrasound.

As a further measure, the fluidized-bed tank 3 may be equipped with high-voltage electrodes (not shown) which electrostatically charge the powder particles. Although charging of the powder is not imperative for the process according to the invention, it has the advantage that increased amounts of material are applied at points and edges of the bar or coil which is to be insulated, on account of a local increase in the electric field. This is desirable since in operation the field strength is likewise higher at these locations, and experience has shown that this is where voltage tends to break through the insulation.

After the dipping operation, the powder is to be allowed sufficient time to completely melt, to run and to crosslink sufficiently for it no longer to flow. Therefore, the gel time of the powder, which is to be explained in more detail below, is of significance.

During the dipping operation, the bar eyelets of the transposed bars are used as suspension points. Additional suspension or supporting of the bar cannot be achieved with the fluidized-bed sintering process, since there would then be no coating at these points. Therefore, the fluidized-bed sintering process is limited to relatively short bars with a length of up to approx. 3 m, since larger bars would sag excessively. This impairs the application of the process in particular for the insulation of transposed bars of a turbo generator, which have bar lengths of up to 10 m. By contrast, motors are considerably shorter, so that the process according to the invention should be applicable to all current standard motors. The motor coils are held at the coil eyelets during coating, and these eyelets remain free of insulation. It is desirable for the coil eyelets to remain free of insulation, since otherwise the required deformability of the coil to allow installation in the stator would no longer be ensured.

In a further specific embodiment of the invention, the fluidized-bed sintering process according to the invention is also used in order to additionally insulate the coil eyelets, which have hitherto been free of insulation, after insulation and complete installation of the motor coils in the stator. For this purpose, the motor stator is positioned vertically, and the coils are heated electrically. Then, the coil eyelets of the lower end of the coil are coated as a result of the coil ends being immersed in a fluidized-bed sintering tank. Then, the stator is rotated through 180°, and the coil eyelets of the other end of the stator are coated.

In principle, all thermally crosslinkable plastics, known as thermosets, can be used as materials for the insulation. The requirement that the insulation be thermally suitable for use at up to 180° C. in the present application is best satisfied by epoxy materials. These materials consist of a mixture of at least one uncrosslinked resin and at least one hardener (as well as a few further additions, such as accelerators, pigments, etc.) and inorganic fillers. The mixture is solid up to at least 50° C. The melting and curing temperatures and the glass transition temperature $T_g$ vary according to the chemical composition of resin and hardener. The temperature profile of the mechanical and dielectric strength is closely linked to the glass transition temperature $T_g$.

If it is desired for the insulation to be usable for thermal class H, $T_g$ should lie in this range, preferably between 150° C. and 200° C. Glass transition temperatures of significantly above 200° C. are, on the one hand, difficult to achieve and, on the other hand, lead to a material which is relatively brittle in the region of room temperature. Class H-specific powders which are based on epoxy and are made up for fluidized-bed sintering, both filled and unfilled, are commercially available.

The abovementioned, desired freedom from bubbles is dependent not only on process parameters, such as the application thickness, but also on materials properties.

It is important that the epoxy in the liquid state has a sufficiently low viscosity to run well and for the gel time to be long enough for all the bubble-forming impurities to have evaporated. This requirement for long gel times contradicts the conventional trend in powder coating, namely that of deliberately establishing short gel times, for example typically of 15 s, by the addition of accelerators in order to achieve high throughput times during thin-film coating. However, by reducing the level of accelerator, it is possible without difficulty to reach gel times for commercially available powders of $\geq 40$ s, which are sufficiently long for the present application.

For spray powders, the viscosity is generally not measured and specified as a separate variable; rather, what is known as the run, resulting from the viscosity and gel time, is specified. Bubble-free layers are achieved if the run is >30 mm.

The filling with inorganic fillers is in principle desirable in order to reduce the price, improve the creep strength, reduce the coefficient of thermal expansion and improve the thermal conductivity of the insulation. The proportion of filler in the total mixture should amount to 5–50% by weight, based on a closed filler density of up to 4 g/cm$^3$. Examples of conventional fillers are silica flour, wollastonite, talc and chalk dust with grain sizes of around 10 $\mu$m (mean grain size $d_{50}$). To produce a spray powder, the filler is mixed and compounded with resin, hardener and further additives. The compounded product is then milled to form powder.

These milling processes are usually carried out in appliances made from steel or hard metal (Mohs hardness 5–6). The use of hard fillers, e.g. silica flour (hardness 7), leads to metallic abrasion, preferably in the form of chips in the sub-mm range. These are incorporated in the insulation and, on account of their acicular geometry, lead to locations where the electric field strength is locally very greatly increased, where experience has shown that an electrical breakdown can occur. The abrasion is avoided by using "soft" fillers (Mohs hardness $\leq 4$), e.g. chalk dust, and/or by using relatively fine fillers with $d_{50} << 1$ $\mu$m, e.g. clay, $SiO_2$, ZnO or $TiO_2$.

Furthermore, fine fillers of this type have the advantage that, even if defects such as cavities or metallic inclusions are present, they prevent or at least very considerably delay electrical breakthrough, as disclosed, for example, in U.S. Pat. No. 4,760,296, in the name of Johnston et al., or in German patent application DE 40 37 972 A1. In these two publications, the effect of increasing the service life is achieved by completely or partially replacing the coarse filler with fillers which have grain sizes in the nanometer range (0.005 to 0.1 μm maximum grain size). However, nanofillers have the unacceptable additional property of greatly increasing the melt viscosity of the powder mixture, known as the thixotropy effect. This causes problems both during production of the powder and during processing thereof. Nevertheless, nanofillers represent a usable alternative for increasing the service life. However, for the application according to the invention it has also been found that the alternative of using $TiO_2$ powder with mean grain sizes of approx. 0.2 μm to completely or partially replace coarse fillers does not lead to a disadvantageous increase in the melt viscosity yet nevertheless does produce the effects of increasing service life in the same way as nanofillers. The proportion of $TiO_2$ powder in the total mixture should be at least 3%, preferably at least 5%.

Conductive layers which are used for internal corona-discharge protection and external corona-discharge protection can be produced by the use of conductive fillers, such as for example graphite, carbon black and/or metal powder.

In the text which follows, the process according to the invention for the insulation of electrical conductors or conductor bundles will be described in more detail.

The process comprises the following steps:

1) Mounting of the rod or coil on a lowering device

Figure 31:
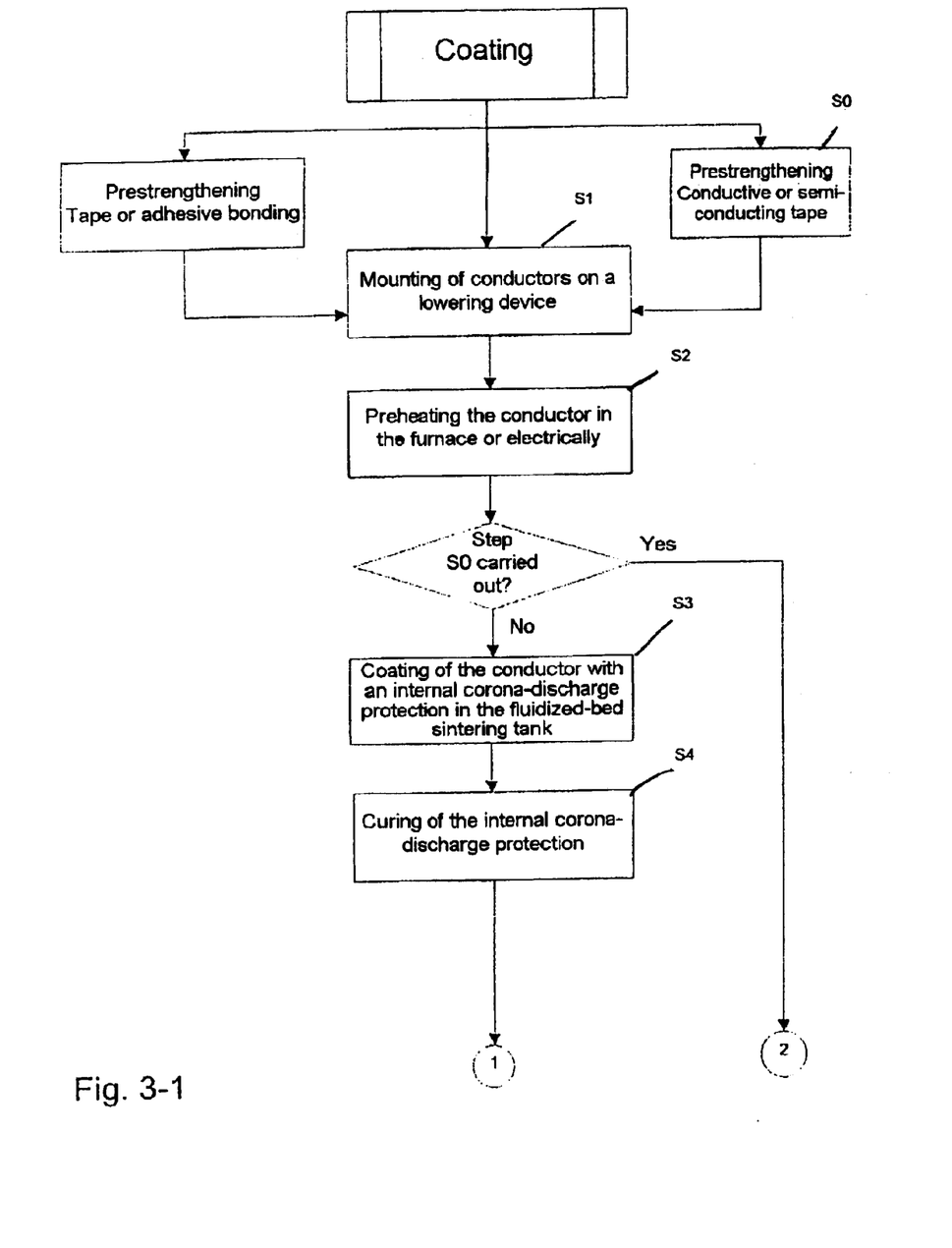

At the start of the coating process, first of all, in a first step S1, the bar or coil is secured to a lowering device. The holding points used to secure it to the lowering device are the rod ends, in the case of a rod, or the coil eyelets, in the case of a coil. For reliable and stable holding of the bar or coil on the lowering device, it is advantageous if the bar or coil is prestrengthened before the coating begins, by internal adhesive bonding of the conductors or by winding a tape around the conductor (step S0).

2) Preheating the rod or coil

Then, in step S2, the bar or coil is preheated. There are two alternative heating processes which can be used. Either, in a step 2a, the bar or coil is introduced into a furnace, where it is preheated to the predetermined coating temperature, or, in a step 2b, the bar or coil is connected to an electrical heater which heats the bar or coil to the desired substrate temperature.

3) Coating of the bar or coil with an internal corona-discharge protection in the fluidized-bed sintering bath In a third step S3, the preheated bar or coil which is secured to the lowering device is lowered with the aid of the lowering device into a fluidized-bed sintering tank 3 which is filled with coating powder. This fluidized-bed sintering tank 3 is, for example, a tank which is sufficiently large to accommodate the bar or coil which is to be coated, and contains a coating powder. This coating powder, which is intended to form an internal corona-discharge protection, is either a conductive or a semiconducting epoxy. A layer of epoxy powder melts on the heated substrate and forms a continuous liquid film. The film thickness of the internal corona-discharge protection is in this case controlled by means of the dwell time in the tank.

4) Curing of the internal corona-discharge protection on the bar or coil

As soon as a desired coating thickness of the internal corona-discharge protection, for example approx. 0.1 mm, has been reached, in a step S4 the lowering device lifts the bar or coil out of the tank. Then, the bar or coil is heated again for approx. 2 min., once again by means of a furnace or by means of electrical heating, in order to gel the liquid insulating layer.

However, the steps S3 and S4 for application of an internal corona-discharge protection which have been outlined above are only necessary if a tape provided with a conductive or semiconducting layer for prestrengthening the bar or coil has not been used in step S0.

5) Application of the insulating layer to the bar or coil

Figure 32:
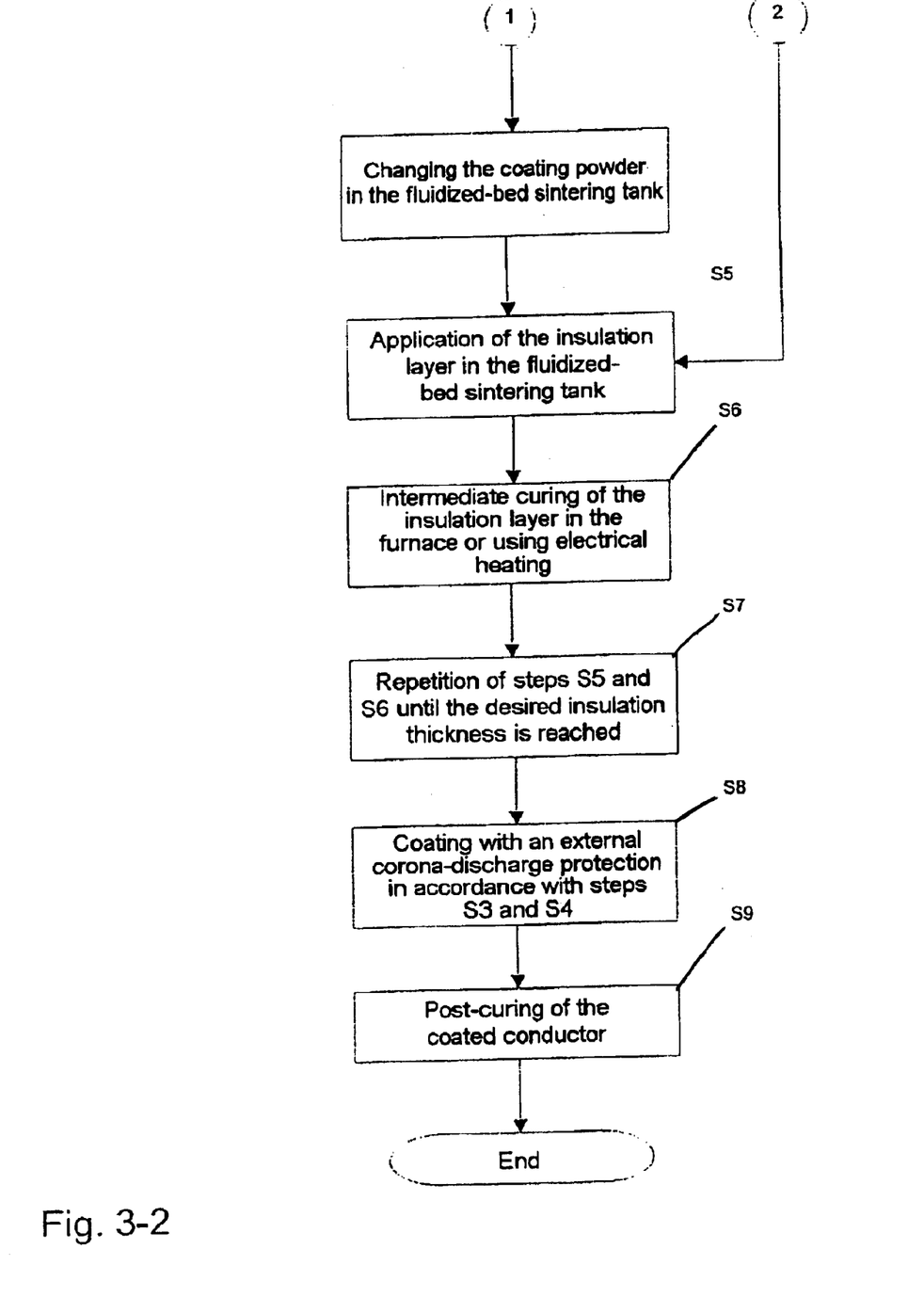

In the following step S5, the actual insulation is applied to the bar or coil. For this purpose, the bar or coil is once again lowered into the fluidized-bed sintering tank 3 on the lowering device. In this case, the fluidized-bed sintering tank 3 contains an insulating powder. In the process, the insulating powder melts on the surface of the preheated bar or coil and forms a continuous liquid film. The bar or coil is held submerged in this fluidized-bed sintering tank 3 until a desired layer thickness per immersion pass of $\leq 0.2$ mm, preferably 0.1 mm, is reached, i.e. approx. 1 to 6 s.

6) Intermediate curing of the insulation of the bar or coil

Then, in step S6, the insulation undergoes intermediate curing for approx. 2 to 10 minutes, in order to provide any volatile components which may be present in the insulating powder which has melted time to escape. It is possible that the coating thickness which has formed may require readjustment of the substrate temperature, i.e. the temperature of the bar or coil. The monitoring of the surface temperature, on the basis of which it is established when the substrate temperature needs to be readjusted, is in this case carried out without contact. By way of example, contactless measurement of this type is carried out by means of an IR pyrometer during the period in which the bar or coil is located outside the fluidized-bed sintering tank or bath.

7) Repetition of coating steps S5 and S6

Since a desired insulation thickness cannot generally be achieved in one coating step S5 and S6, next, in step S7, the coating steps for application of the insulating layer to the bar or coil are repeated until the desired insulation thickness is reached.

8) Coating of the bar or coil with an external corona-discharge protection

Now, following the coating with the insulating layer, as soon as a coating thickness of an insulating layer is recorded as matching the desired insulation thickness, in step S8, as the final coating of this bar or coil, an external corona-discharge protection is applied. This external corona-discharge protection consists of a conductive epoxy, which is likewise contained in the fluidized-bed sintering tank in the form of a powder. The individual process steps involved in the application of this external corona-discharge protection correspond to the steps S3 and S4 which have already been described in connection with the application of the internal corona-discharge protection.

9) Post-curing of the bar or coil

As the final step S9 involved in the coating of the bar or the coil, the coating is cured for approx. 20 to 60 min, either in a furnace or by means of electrical heating, in order to increase its strength.

Therefore, the invention discloses a process which allows a defect-free insulation for conductors or conductor bundles to be produced in a simple way and at low cost, without the need for special equipment.

To summarize, the invention discloses a process for producing a high-quality insulation on a conductor or conductor bundle for rotating electrical machines, in which, in successive immersion passes in a fluidized-bed sintering tank, internal corona-discharge protection, insulation and external corona-discharge protection are applied, in each case with layer thicknesses of $\leq 0.2$ mm. The sintering and curing take place at temperatures of approx. 200° C., so that it is possible to use materials which satisfy the demands imposed on the insulation for such conductors or conductor bundles of rotating electrical machines. Furthermore, the production process, in particular the layer thickness selected for the individual layers, ensures that the individual layers are free from defects, so that it is impossible for there to be any partial discharges which would otherwise cause damage to the insulation.

What is claimed is:

1. A process for producing an insulation for conductors or conductor bundles of rotating electrical machines, comprising:
   (S1) mounting a conductor or conductor bundle which is to be coated on a lowering device;
   (S2) preheating the conductor or conductor bundle to a predetermined substrate temperature;
   (S3) coating the conductor or conductor bundle with an insulating layer by lowering it by the lowering device into a fluidized-bed tank holding a first coating powder, until a layer thickness of $\leq 0.2$ mm is reached, and recording a surface temperature of the conductor or conductor bundle which is to be coated by a measuring device, and readjusting the substrate temperature if the surface temperature recorded falls below the predetermined substrate temperature;
   (S4) intermediately curing the insulating layer of the conductor or conductor bundle by heating after the conductor or conductor bundle has been lifted out of the fluidized-bed tank;
   (S5) repeating steps S3 and S4 until a desired insulating-layer thickness comprising a plurality of insulating-layer films has been applied;
   (S6) coating the conductor or conductor bundle with an external corona-discharge protection by lowering it by the lowering device into the fluidized-bed tank holding a second coating powder, until a layer thickness of $\leq 0.2$ mm is reached;
   (S7) intermediately curing the insulating layer of the conductor or conductor bundle by heating after the conductor or conductor bundle has been lifted out of the fluidized-bed tank; and
   (S8) curing the entire insulation of the conductor or conductor bundle by heating.

2. The process as claimed in claim 1, in which the conductor or conductor bundle is selected from the group consisting of a conductor bar, a transposed bar, and a coil.

3. The process as claimed in claim 1, further comprising, performed before the step of preheating the conductor or conductor bundle:
   (S0) prestrengthening the conductor or conductor bundle by a process selected from the group consisting of internally adhesive bonding and winding a tape around the conductor or conductor bundle.

4. The process as claimed in claim 3, wherein prestrengthening comprises winding a tape, wherein the tape comprises a strip including a semiconducting or conductive layer, the strip forming an internal corona-discharge protection.

5. The process as claimed in claim 1, wherein the predetermined substrate temperature is approximately 20° C. above the melting point of the coating powder.

6. The process as claimed in claim 1, wherein the pre-heating of (S2) further comprises either placing the conductor or conductor bundle in a furnace or electrical heating.

7. The process as claimed in claim 6, wherein pre-heating (S2) comprises electrical resistance heating.

8. The process as claimed in claim 1, wherein the first coating powder comprises an insulating powder, and the second coating powder comprises a conductive, thermally crosslinkable plastic.

9. The process as claimed in claim 8, wherein the conductive or semiconducting, thermally crosslinkable plastic is an epoxy resin in the B state.

10. The process as claimed in claim 1, wherein curing the entire insulation (S8) further comprises placing the conductor or conductor bundle in a furnace or electrical heating.

11. The process as claimed in claim 2, wherein mounting (S1) further comprises holding the bar at the bar ends or the coils at the coil eyelets.

12. The process as claimed in claim 2, further comprising:
   (S9), when the conductor or conductor bundle selected is a coil, fitting the coil, positioning the motor stator vertically, electrically heating the coil, and immersing the coil eyelets in the fluidized-bed tank in order for them to be coated with epoxy, in each case for both sides of the coil.

13. The process as claimed in claim 1, further comprising electrostatically charging the coating powder, so that increased amounts of material are applied to points and edges of the conductor or conductor bundle being coated.

14. The process as claimed in claim 13, wherein the step of electrostatically charging the coating powder comprises charging with electrodes provided in the fluidized-bed tank.

15. The process as claimed in claim 2 further comprising:
   (S9), when the conductor or conductor bundle selected is a conductor bar or a transposed bar, of fitting after the conductor bar or transposed bar, positioning the motor stator, vertically resistively heating the motor winding and insulating the end parts by spray coating and sintering for both ends of the conductor bar or transposed bar.

16. The process as claimed in claim 1, wherein the step of coating the conductor or conductor bundle (S3) comprises immersion of the conductor or conductor bundle in the second coating powder for between about 1 and 6 seconds.

17. The process as claimed in claim 1, wherein said curing (S8) results in an insulation having a thermal stability up to about $T_{max}=180°$ C. and able to withstand a maximum field of about 5 kV/mm without being damaged.

18. The process as claimed in claim 1, further comprising, between said preheating (S2) and said coating (S3):
   (S2.1) coating the conductor or conductor bundle with an internal corona-discharge protection by lowering it, by the lowering device, into a fluidized-bed tank holding a third coating powder until a layer thickness of $\leq 0.2$ mm is reached;
   (S2.2) lifting the conductor or conductor bundle out of the fluidized-bed tank by the lowering device as soon as a desired coating thickness is reached; and (S2.3) curing the internal corona-discharge protection by heating.

19. The process as claimed in claim 18, wherein the third coating powder comprises conductive or semiconducting thermally crosslinkable plastic.

20. The process as claimed in claim 18, wherein coating (S2.1) further comprises melting the coating powder on the heated conductor or conductor bundle, and applying the layer thickness by controlling the dwell time in the fluidized-bed tank and the temperature of the work piece.

21. The process as claimed in claim 20, wherein controlling the dwell time in the fluidized-bed tank further comprises using a coating robot to monitor the dwell time.

* * * * *